United States Patent [19]

Lewyn

[11] Patent Number: 5,130,570

[45] Date of Patent: Jul. 14, 1992

[54] CONSTANT-CURRENT INTEGRATED POWER SUPPLY

[75] Inventor: Lanny L. Lewyn, Laguna Beach, Calif.

[73] Assignee: Brooktree Corporation, San Diego, Calif.

[21] Appl. No.: 620,768

[22] Filed: Dec. 3, 1990

[51] Int. Cl.⁵ .............................................. H03K 3/01
[52] U.S. Cl. ..................................... 307/296.6; 307/246
[58] Field of Search .................. 307/296.6, 246, 261, 307/520; 328/26

[56] References Cited

U.S. PATENT DOCUMENTS 3,962,591  6/1976  Popka .................................. 307/246
4,922,139  5/1990  Giebel ................................. 307/520

Primary Examiner—Eugene R. LaRoche
Assistant Examiner—A. Zarabian
Attorney, Agent, or Firm—Ellsworth R. Roston; Charles H. Schwartz

[57] ABSTRACT

A positive energizing voltage, preferably in a CMOS circuit, is converted, primarily by a pair of buffer capacitors and secondarily by a filter capacitor, to a particular negative potential. One buffer capacitor is charged through first switches by the positive voltage during the positive half cycles of a clock signal. The buffer capacitor is discharged to a load during the negative half cycles of the clock signal through a circuit including such buffer capacitor, second switches, a third switch, a reference voltage (e.g. ground) line and a line for providing a negative biasing potential. The other buffer capacitor is charged through fourth switches by the positive voltage during the negative half cycles of the clock signals. This buffer capacitor is discharged to the load during the positive half cycles of the clock signals through a circuit including such other buffer capacitor, fifth switches, the third switch, the reference voltage line and the negative potential line. The third switch has at each instant a variable state of conductivity dependent upon the magnitude of the negative biasing potential at that instant. The magnitude of the negative potential is varied in accordance with the variations in the state of conductivity of the third switch to regulate the negative potential at a particular value. The filter capacitor is charged by the negative biasing potential and is discharged to the load when the second and fifth switches are simultaneously open. This occurs for a brief interval every time that the polarity of the clock signal changes.

20 Claims, 4 Drawing Sheets

CONSTANT-CURRENT INTEGRATED POWER SUPPLY

This invention relates to apparatus for converting a positive voltage into a negative voltage. More particularly, the invention relates to CMOS circuits for converting a positive energizing voltage into a regulated negative voltage for energizing a load.

Complementary metal-oxide (CMOS) circuits in integrated circuit chip generally employ positive voltages to energize transistors and other components on the integrated circuit chip and control the operation of transistors on the integrated circuit chip. One advantage of CMOS circuits over other types of circuits (such as bi-polar) is that only positive voltages (and not negative voltages) have to be used to energize the circuits in the integrated circuit chip. Other advantages of CMOS chips over other types of chips is that they consume relatively low amounts of power and that the components such as the transistors are closely packed on the chips.

It may sometimes be desired to provide a negative voltage on a CMOS integrated circuit chip to perform certain functions not capable of being performed when only a positive voltage is available. For example, it may sometimes be desired to energize a load on a CMOS chip with a negative voltage. Furthermore, it may be sometimes desired to regulate this negative voltage so that the negative voltage remains constant even when current flows from the source of the negative voltage to the load.

Circuits have been devised in the prior art for obtaining a negative voltage in a CMOS integrated chip and for introducing this negative voltage to a load to obtain a flow of current to the load. The negative voltage in prior art CMOS circuits has generally been obtained by charging a buffer capacitor connected in the circuit to provide the negative voltage and by charging a filter capacitor connected in the circuit to energize the load. One problem with the prior art CMOS circuits has been that the negative voltage from the filter capacitor tends to change as the filter capacitor discharges to the load so that the negative voltage does not remain constant. As will be appreciated, such variations in the negative voltage tend to affect the operations of the circuits controlled by the negative voltage. This problem has existed for some time even though considerable effort has been devoted, and significant financial resources have been provided, to resolve the problem.

This invention provides a CMOS circuit which converts a positive energizing voltage into a stable and regulated voltage for energizing a load. The negative voltage remains substantially constant even during the time that the load is having energized. The invention employs a pair of buffer capacitors and a filter capacitor. However, the buffer capacitors primarily discharge to the load. This discharge occurs on a push-pull basis in synchronism with successive half cycles of a clock signal. The filter capacitor discharges to the load only during the time that neither of the buffer capacitors is discharging to the load. This occurs at the transition between the successive half cycles in the clock signals.

In one embodiment of the invention, a positive energizing voltage, preferably in a CMOS circuit, is converted, primarily by a pair of buffer capacitors and secondarily by a filter capacitor, to a particular negative potential. One buffer capacitor is charged through first switches by the positive voltage during the positive half cycles of a clock signal. This buffer capacitor is discharged to a load during the negative half cycles of the clock signal through a circuit including the buffer capacitor, second switches, a third switch, a reference voltage (e.g. ground) line and a negative potential line for providing a negative biasing potential. The second buffer capacitor is charged through fourth switches by the positive voltage during the negative half cycles of the clock signals. This buffer capacitor is discharged to the load during the positive half cycles of the clock signals through a circuit including this buffer capacitor, fifth switches, the third switch, the reference voltage line and the negative potential line.

The third switch has at each instant a variable state of conductivity dependent upon the magnitude of the negative potential at that instant. The magnitude of the negative biasing potential is varied in accordance with the variations in the state of conductivity of the third switch to regulate the negative potential at a particular value. The filter capacitor is charged by the negative biasing potential and is discharged to the load when the second and fifth switches are simultaneously open. This occurs for a brief interval every time that the polarity of the clock signal changes.

BRIEF DESCRIPTION OF DRAWINGS

FIG. 1 illustrates a circuit which has been used in the prior art to convert a positive energizing voltage in a CMOS integrated circuit chip into a negative potential for energizing a load. The prior art circuit includes a source 10 of clock signals which are illustrated at 12 in FIG. 2. The clock signals are introduced to a level shifter 14 which may be constructed in a conventional manner. The level shifter 14 is energized by a positive voltage from a source 16. The level shifter 14 is also connected to a source 20 of a reference potential such as ground.

Figure 1:
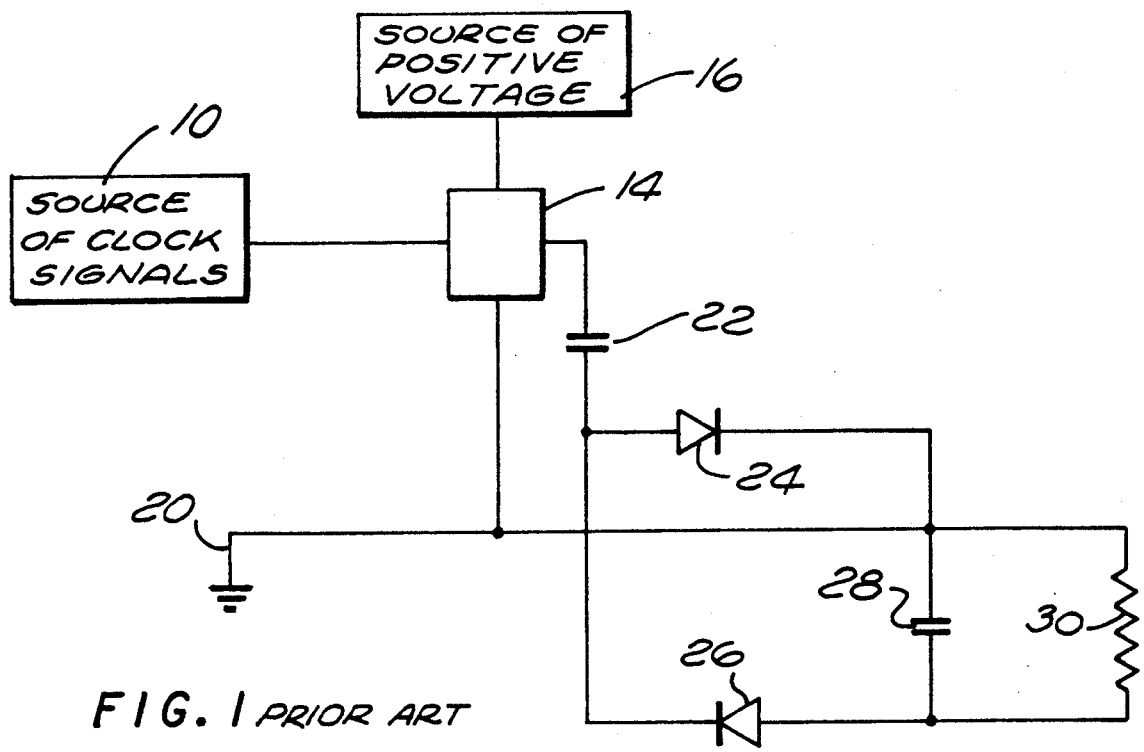
FIG. 1 is a circuit diagram schematically illustrating a circuit in the prior art for converting a positive energizing voltage in a CMOS integrated circuit chip into a negative potential for energizing a load.

The level shifter 14 is also connected to one terminal of a buffer capacitor 22, the other terminal of which is common with the anode of a diode 24 and the cathode of a diode 26. The cathode of the diode 24 has a common terminal with one terminal of a filter capacitor 28, this terminal being connected to the reference potential such as ground. The anode of the diode 26 has a common terminal with the other terminal of the filter capacitor 28. The filter capacitor 28 has a significantly higher value than the buffer capacitor 22. A load 30 indicated schematically by a resistor is connected across the filter capacitor 28.

As previously indicated, the clock signals from the source 10 are indicated at 12 and are represented by alternate half cycles of positive and negative polarities. The positive half cycles may have a positive potential of approximately five volts (5 V) and the negative half cycles may be at the reference potential such as ground. This is indicated at 12 in FIG. 2.

Figure 2:
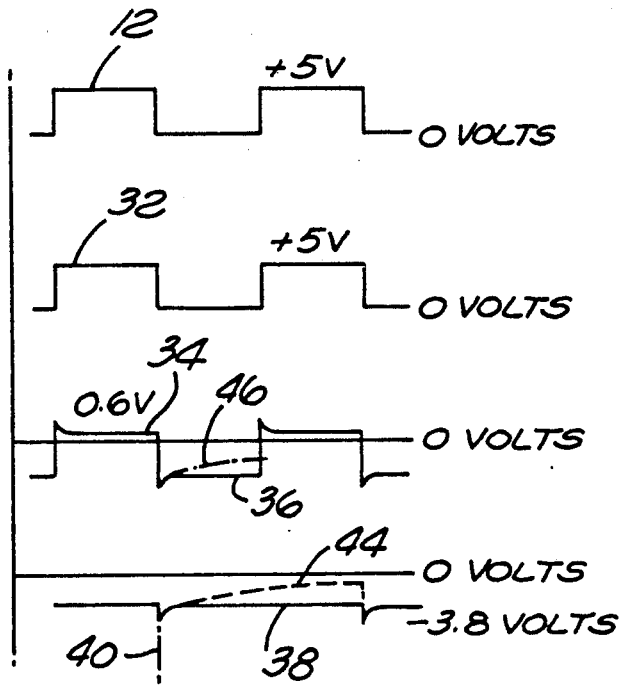
FIG. 2 illustrates voltage waveforms at strategic terminals in the circuit shown in FIG. 1.

The voltage from the level shifter is indicated at 32 in FIG. 2. This voltage charges the buffer capacitor 22 through a circuit including the buffer capacitor and the diode 24 so that a positive potential is produced at the upper terminal of the capacitor. Because of the potential drop such as sixth tenths of a volt (0.6 V) across the diode 24, a positive potential is also produced on the lower terminal of the capacitor 22 as indicated at 34 in FIG. 2. In the negative half cycles of the clock signal 12, the voltage on the lower terminal of the buffer capacitor becomes negative because of the drop in the voltage across the buffer capacitor. This is indicated at 36 in FIG. 2.

As will be seen, the upper terminal of the filter capacitor 28 is at ground. The filter capacitor 28 becomes charged during the negative half cycles of the clock signal 12 to produce a negative voltage at its lower terminal. This results from the inclusion of the diode 26, which is back biased to pass the negative voltage 36 on the lower terminal of the buffer capacitor 22 to the lower terminal of the filter capacitor. The negative voltage on the lower terminal of the filter capacitor 28 is accordingly about three and eight tenths volts (3.8 V).

When the load 30 is relatively small, the filter capacitor 28 discharges to the load. The voltage across the filter capacitor 28 varies slightly as a result of this discharge. This is indicated at 38 in FIG. 2. The charge in the filter capacitor 28 becomes replenished at the beginning of each negative half cycle in the clock signal 12 as indicated at 40 in FIG. 2.

When the load 30 is relatively large, the discharge of the filter capacitor 26 becomes more pronounced. This causes the voltage at the lower terminal of the filter capacitor 28 to vary at a sharper rate than the variation in the voltage 38. This is indicated in broken lines at 44 in FIG. 2. Furthermore, the buffer capacitor 22 discharges to the load 30 during the negative half cycles of the clock signal 12 to aid the discharge of the filter capacitor 28. As a result, the voltage on the lower terminal of the buffer capacitor 22 varies during the negative half cycles of the clock signal. This is indicated at 46 in FIG. 2. The variations in the voltages at the lower terminal of the buffer capacitor 22 and on the lower terminal of the filter capacitor 28 are not desirable because they affect the voltage across the load 30.

Figure 3:
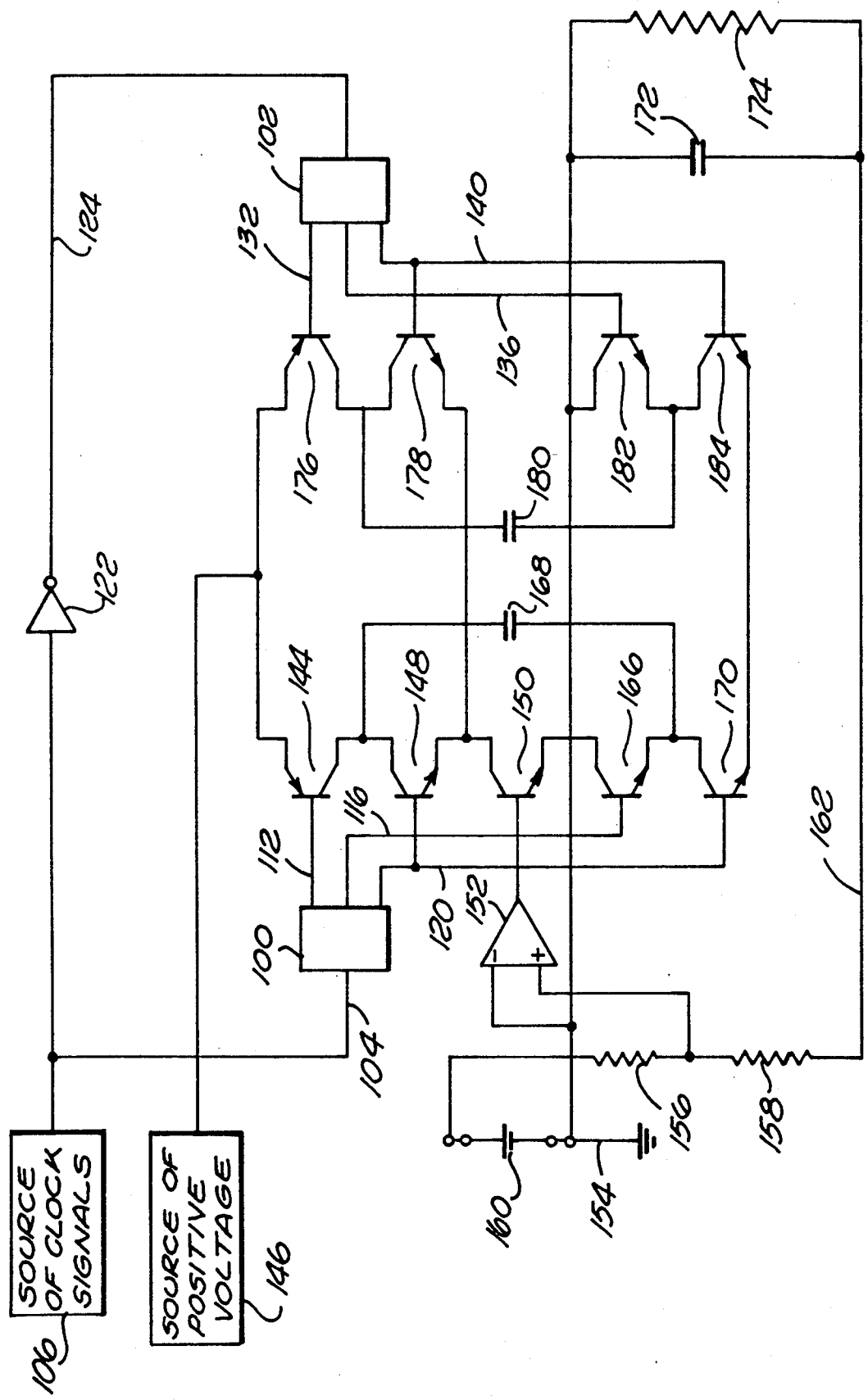
FIG. 3 is a circuit diagram of one embodiment of the invention for converting a positive energizing voltage in a CMOS integrated circuit chip into a stable and regulated negative potential for energizing a load.

FIG. 3 illustrates an embodiment of the invention, this embodiment preferably being preferably constructed on a CMOS integrated chip. In this embodiment, level shifters 100 and 102 are provided, each operative in a manner similar to the level shifter 14 of FIG. 1. The level shifter 100 is adapted to receive clock signals on a line 104 from a source 106 as indicated at 108 in FIG. 4a. These signals may vary in amplitude between +2.75 volts and −2.25 volts.

The level shifter 100 is adapted to produce signals 110 (FIG. 4a) on a line 112 (FIG. 3), signals 114 (FIG. 4a) on a line 116 (FIG. 3) and signals 118 (FIG. 4a) on a line 120 (FIG. 3). The signals 110 on the line 112 may vary between +5 volts and 0 volts; the signals 114 on the lines 116 may vary between +2.75 volts and −2.25 volts; and the signals 118 on the line 120 may vary between +2.25 volts and −2.75 volts. As will be seen, the signals 118 on the line 120 are opposite in phase to the signals 108, 110 and 114 and may be obtained from an invertor (not shown).

The clock signals from the source 106 are inverted as at 122 and the inverted signals are introduced through a line 124 to the levels shifter 102. This is indicated at 126 in FIG. 4b. The level shifter 102 is adapted to produce signals 130 (FIG. 4b) on a line 132 (FIG. 3), signals 134 (FIG. 4b) on a line 136 (FIG. 3) and signals 138 (FIGS. 4b) on a line 140 (FIG. 3).

The signals on the line 112 are introduced to the gate of a transistor 144, which may be of the p type. The source of the transistor 144 receives a suitable positive voltage such as five volts (5 V) from a source 146 of positive voltage. The drain of the transistor 144 is connected to the drain of a transistor 148, which is preferably of the n type. The gate of the transistor 148 is common to the line 120.

The source of the transistor 148 has a common connection with the drain of a transistor 150, which may be of the n type. The gate of the transistor 150 receives the output from an operational amplifier 152 having input terminals respectively connected to a reference potential such as a ground 154 and to a common terminal between a pair of resistances 156 and 158. The other terminal of the resistance 156 to receives a reference voltage from the positive terminal of a source which is schematically illustrated as a battery 160. The second terminal of the battery 160 is common with the reference potential such as the ground 154. The other terminal of the resistance 158 is common with a line 162 which receives a negative biasing potential such as −2.75 volts.

The source of the transistor 150 and the drain of a transistor 166 (which may be an n type) receive the reference potential such as ground. The gate of the transistor 166 is connected to receive the signals 114 on the line 116. The source of the transistor 166 is connected to one terminal of a buffer capacitor 168, the other terminal of which is common with the drains of the transistors 144 and 148.

The source of the transistor 166 and the drain of a transistor 170 (which may be of the n type) have a common connection. The gate of the transistor 170 receives the signals 118 on the line 120. The source of the transistor 170 is common with the line 162 providing the negative biasing potential. A filter capacitor 172 is connected between the line 162 and the ground 154. A load schematically illustrated as a resistance 174 is connected across the filter capacitor 172.

The signals 130 on the line 132 are introduced to the gate of a transistor 176 which may be of the p type. The source of the transistor 176 is energized by the positive voltage from the source 146. The drain of the transistor 176 is common with the drain of a transistor 178, which may be of the n type, and with one terminal of a buffer capacitor 180. The buffer capacitor 180 may have the same value as the capacitor 148. The gate of the transistor 178 receives the signals 138 on the line 140. The source of the transistor 178 is connected to the source of the transistor 148 and the drain of the transistor 150.

The drain of a transistor 182 (which may be of the n type) is common with the reference potential such as the ground 154. The gate of the transistor 182 receives the signals 134 on the line 136. Connections are made from the source of the transistor 182 to the drain of a transistor 184, which may be the n-type, and to the second terminal of the buffer capacitor 180. The signals 138 on the line 140 are introduced to the gate of the transistor 184. The source of the transistor 184 is common with the line 162.

Figure 4A:
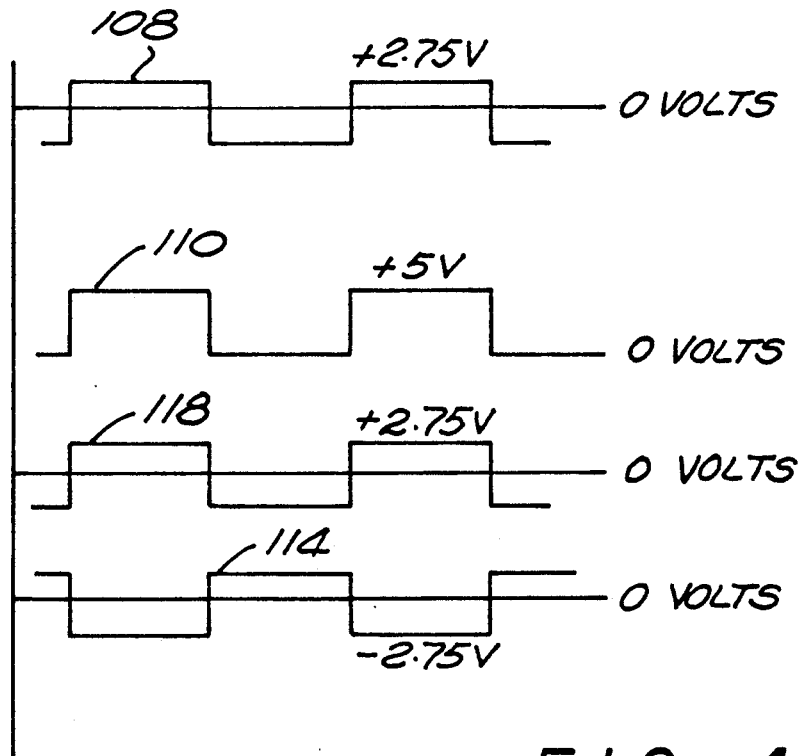
FIGS. 4a and 4b illustrate waveforms of voltages at strategic terminals in the circuit shown in FIG. 3 for driving the output of such circuit.
Figure 4B:
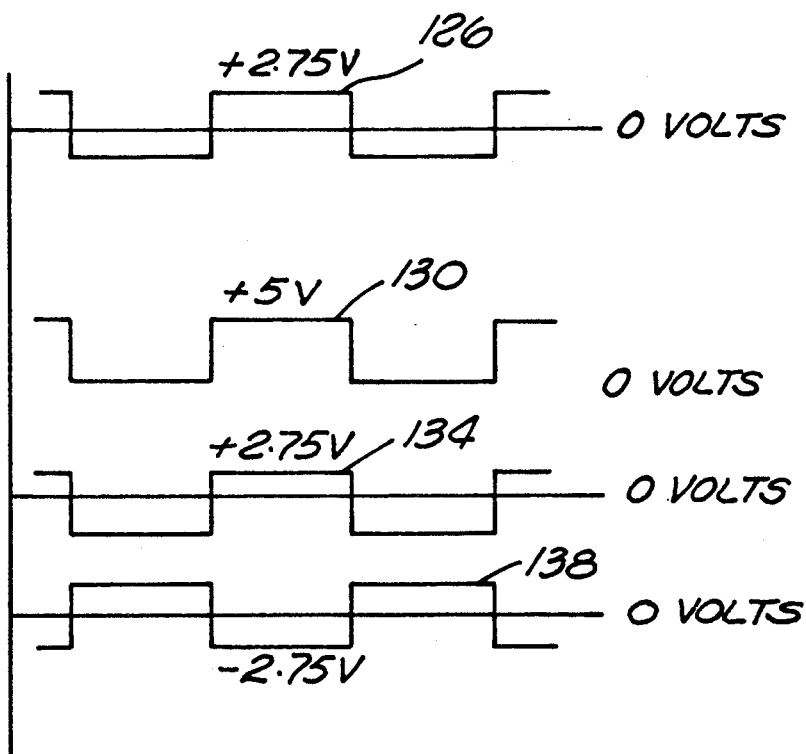
Figure 5A:
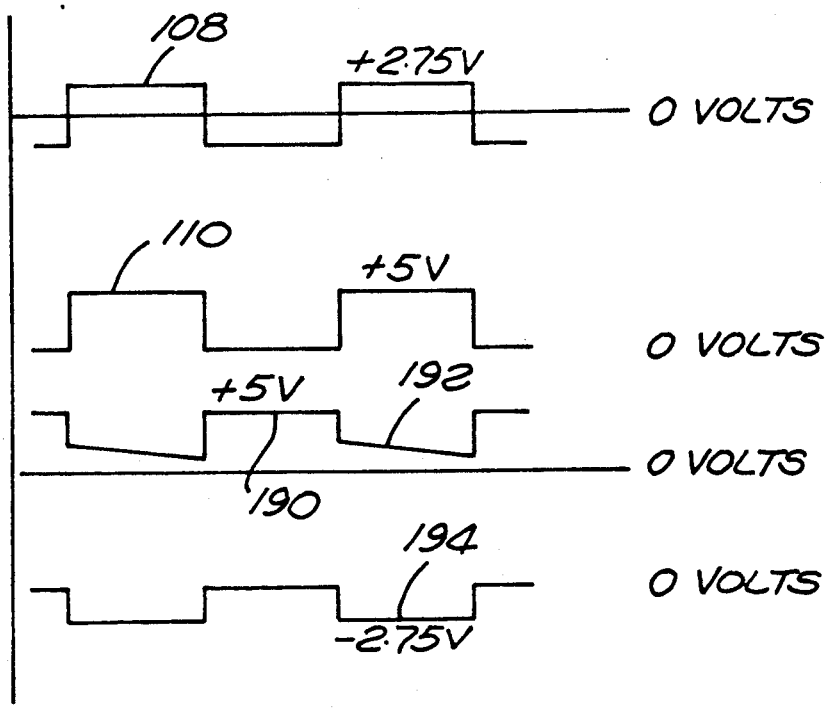
FIGS. 5a and 5b illustrate waveforms of output voltages at strategic terminals in the embodiment shown in FIG. 3.
Figure 5B:
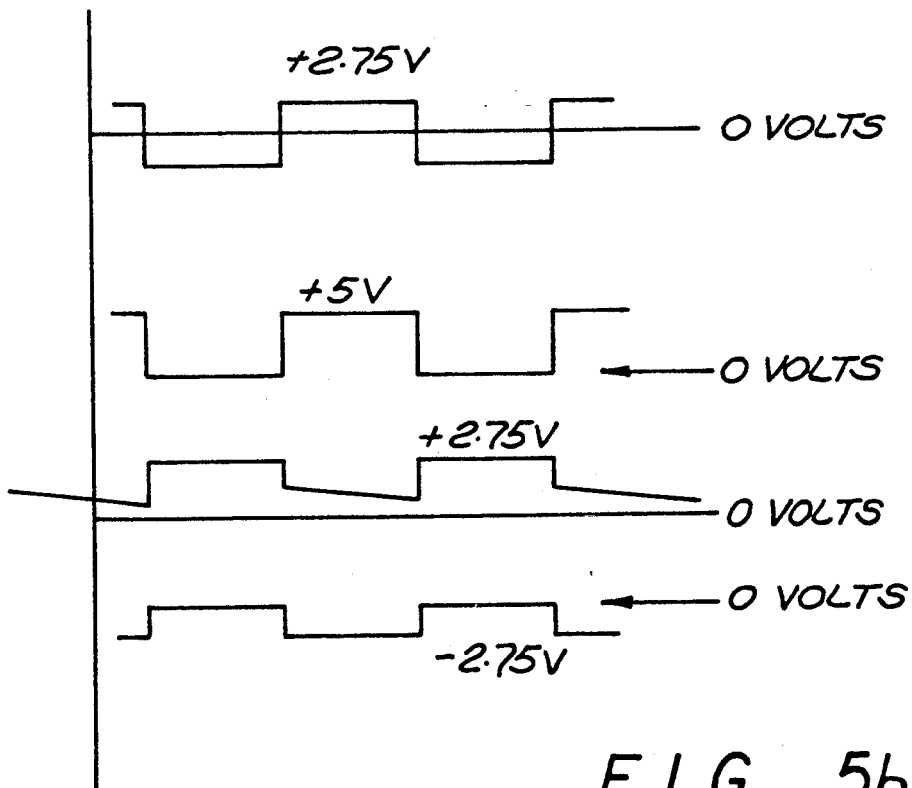

As previously indicated, FIGS. 4a and 4b illustrate the waveforms of signals for driving the embodiment shown in FIG. 3. FIGS. 5a and 5b illustrate the waveforms voltage waveform 108 on the line 104 in FIG. 4a is repeated in FIG. 5a as is the voltage waveform 110 on the line 112. When the voltage waveform 110 on the line 112 is negative, the transistor 144 passes a current. The transistor 166 also passes a current at the same time because of the introduction to the gate of transistor of the positive voltage 114 on the line 116. This causes the buffer capacitor 168 to be charged through a circuit including the voltage source 146, the transistor 144, the buffer capacitor, the transistor 166 and the ground 154.

Similarly, the positive half cycles of the clock signals from the source 106 become inverted by the invertor 122. In these half cycles, the buffer capacitor 180 becomes charged through a circuit including the voltage source 146, the transistor 176, the buffer capacitor and the transistor 182 and the ground 154.

In the positive half cycle of the clock signal 108 on the line 104, the signal 118 on the line 120 becomes positive. This causes the transistors 148 and 170 to become conductive. Current accordingly flows through a circuit including the buffer capacitor 168, the transistor 148, the transistor 150, the ground 154, the filter capacitor 172, the line 162 and the transistor 170. The resultant discharge of the buffer capacitor 168 causes a negative potential to be produced on the line 162. The discharge of the buffer capacitor 168 also causes the load 174 to be energized. In like manner, current flows in the negative half of the clock signals from the source 106 through a circuit including the buffer capacitor 180, the transistor 178, the transistor 150, the ground 154, the filter capacitor 172, the line 162 and the transistor 184.

The filter capacitor 172 becomes charged during the discharge of the buffer capacitors 168 and 180. The filter capacitor 172 becomes discharged to the load 174 only during the time that both of the transistors 170 and 184 are simultaneously non-conductive. This occurs only in the transitions between the positive half cycles and the negative half cycles of the clock signal 108 from the source 106. As a result, the load is energized primarily by the buffer capacitors 168 and 180 and only secondarily by the filter capacitors 172. This is in contrast to the circuit shown in FIG. 1 where the load 30 is energized primarily by the filter capacitor 28 and only secondarily by the buffer capacitor 22.

As illustrated at 190 in FIG. 5a, the upper terminal of the buffer capacitor 168 is at a potential of +5 volts during the half cycles of the clock signal when the buffer capacitor is being charged from the voltage source 146. During the half cycles of the clock signal when the buffer capacitor 168 is discharging to the load 174, the voltage on the upper terminal of the buffer capacitor progressively decreases toward ground. This is illustrated at 192 in FIG. 5a. Although the voltage on the upper terminal of the buffer capacitor 148 progressively decreases toward ground during the discharge of the buffer capacitor, the negative terminal of the buffer capacitor 168 remains substantially constant during the discharge of the buffer capacitor. This is illustrated at 194 in FIG. 5a. This is in contrast to the circuit shown in FIG. 1. In the circuit shown in FIG. 1, the voltage on the lower terminal of the buffer capacitor 22 varies when the load 30 is low. This is illustrated by the broken lines 46 in FIG. 2. As will be appreciated, the voltage on the lower terminal of the buffer capacitor 180 also remains constant during the discharge of the buffer capacitor. This is illustrated at 198 in FIG. 5b.

The transistor 150 regulates the currents through the circuits specified in the previous paragraph providing for the discharge of the buffer capacitors 168 and 180 to the load. This regulation is provided by adjustments in the bias voltage applied to the gate of the transistor 150 from the output of the operational amplifier 152. The operational amplifier 152 operates to produce the variations in the output voltage by comparing the reference voltage such as the ground 154 and the voltage on the line 162 as adjusted by the voltage dividing network represented by the resistors 156 and 158. By regulating the current through the discharge circuit for the buffer capacitors 168 and 180, the transistor 150 operates to maintain the voltage on the line 162 at a particular magnitude such as −2.75 volts.

The circuit shown in FIG. 3 and described above has certain important changes. One advantage is that the circuit provides on the line 162 a negative potential which remains substantially constant regardless of the magnitude of the load 174. This results from the fact that changes in the potential across the buffer capacitances 168 and 180 occur primarily at the upper terminals of the buffer capacitors during the discharge of the buffer capacitors. Another advantage is that the energizing of the load occurs primarily from the buffer capacitors 168 and 180 and only secondarily from the filter capacitor 172. Since the voltage across the filter capacitor 172 remains substantially constant and one of the terminals of the filter capacitor is at ground, this assures that the negative potential on the line 162 will remain substantially at a particular magnitude such as approximately −2.75 volts.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for providing energy to a load,
   a source of an energizing potential,
   a source of a reference potential,
   a pair of buffer capacitors,
   a filter capacitor having a larger value than the buffer capacitors,
   means for providing at a particular frequency clock signals alternately having first and second opposite polarities,
   means for inverting the polarities of the clock signals,
   first switching means associated with the source of the energizing potential and the source of the reference potential and with an individual one of the buffer capacitors and responsive to the clock signals for charging the individual buffer capacitor to a particular potential during the first polarity of the clock signals,
   second switching means associated with the source of the energizing potential and the source of the reference potential and with the other one of the buffer capacitors and responsive to the inverted clock signals for charging the other buffer capacitor to the particular potential during the first polarity of the inverted clock signals, third switching means associated with the individual one of the buffer capacitors and responsive to the clock signals for discharging the individual buffer capacitor to the load during the second polarity of the clock signals, fourth switching means associated with the other buffer capacitor and responsive to the inverted clock signals for discharging the other buffer capacitor to the load during the second polarity of the inverted clock signals, the filter capacitor being charged in accordance with the discharge of the buffer capacitors and being operative to discharge to the load when the buffer capacitors are not discharging to the load.

2. In a combination as set forth in claim 1, the third and fourth switching means having conductive and non-conductive states of operation and being operative in the conductive state to provide for the discharge of the associated buffer capacitor to the load and being operative in the non-conductive state to prevent such a discharge, the third and fourth switching means being constructed to provide for an instantaneous operation of both switching means in the non-conductive state during the conversion of such switching means between the conductive and non-conductive states, the filter capacitor being operative to discharge to the load during the time that the third and fourth switching means are simultaneously in the non-conductive state.

3. In a combination as set forth in claim 2, means responsive to the operation of the third and fourth switching means in the conductive state for regulating the current flowing from the buffer capacitors to the load.

4. In a combination as set forth in claim 3, the regulating means including an operational amplifier responsive to the reference potential and the charge in the filter capacitor for producing a control potential and means responsive to the control potential and associated with the third and fourth switching means and the buffer capacitors for regulating the discharge of the buffer capacitors to the load in accordance with the changes in the control voltage.

5. In a combination for providing energy to a load, first and second buffer capacitors, first means for providing at a particular frequency clock signals having first and second opposite polarities, second means operatively coupled to the buffer capacitors and responsive to the clock signals for charging the first buffer capacitor during the first polarity in the clock signals and for charging the second buffer capacitor during the second polarity in the clock signals, filter means, a load, and third means operatively coupled to the buffer capacitors for discharging the first buffer capacitor to the filter means and the load during the second polarity of the clock signals to obtain a charging of the filter means and for discharging the second buffer capacitor to the filter means and the load during the first polarity in the clock signals to obtain a charging of the filter means, the filter means being operative to discharge to the load at the times that the first and second buffer capacitors are not discharging to the load.

6. In a combination as set forth in claim 5, means included in the third means for regulating the discharge of the first and second buffer capacitors to the load in the alternate half cycles.

7. In a combination as set forth in claim 6, the filter means being operative to provide a bias voltage, means for providing a reference voltage, the regulating means including means for providing a control voltage in accordance with differences between the bias voltage and the reference voltage and means for varying the discharge of the first and second buffer capacitors to the load in accordance with the variations in the control voltage to maintain the bias voltage from the filter means at a particular value.

8. In a combination as set forth in claim 7, means associated with the first means for providing a positive voltage for charging the first buffer capacitor during the first polarity in the clock signals and for charging the second buffer capacitor during the second polarity in the clock signals, the third means being operative to discharge the first buffer capacitor in a negative potential to the load during the second polarity of the first clock signals and for discharging the second buffer capacitor in the negative potential to the load during the first polarity in the clock signals.

9. In combination for providing energy to a load, first and second buffer capacitors, means for providing a positive energizing potential, means for providing clock signals having first and second opposite polarities, means for providing a reference potential, first means responsive to the positive energizing potential and the reference potential for charging the first buffer capacitor during the first polarity in the clock signals and for charging the second buffer capacitor during the second polarity in the clock signals, second means for discharging the first buffer capacitor in a negative potential to the load during the second polarity in the clock signals and for discharging the second buffer capacitor in the negative polarity to the load during the first polarity in the clock signals, and a filter capacitor connected to the buffer capacitors to become charged to the negative potential during the discharge of the buffer capacitors and operative to discharge to the load when the first and second buffer capacitors are not discharging to the load.

10. In a combination as set forth in claim 9, the second means being operative to discontinue the discharge of each of the first and second buffer capacitors before providing for the discharge of the other one of the first and second buffer capacitors.

11. In a combination as set forth in claim 10, means associated with the second means for regulating the discharge of the first buffer capacitor in a negative potential to the load during the second polarity in the clock signals and for regulating the discharge of the second buffer capacitor in the negative potential to the load during the first polarity in the clock signals.

12. In a combination as set forth in claim 11,
the regulating means including means for deriving a voltage from the negative potential and means for comparing the reference voltage and the derived voltage to produce variations in a control voltage in accordance with such comparison and further including means for regulating the discharge current from the first and second buffer capacitors in accordance with the variations in the control voltage.

13. In combination for providing energy to a load,
means for providing clock signals having first and second opposite polarities,
means for providing a positive voltage,
first and second buffer capacitors,
first switching means associated with the first buffer capacitor and the positive voltage means for charging the first buffer capacitor from the positive voltage means during the first polarity in the clock signals,
second switching means associated with the second buffer capacitor and the positive voltage means for charging the second buffer capacitor from the positive means during the second polarity in the clock signals,
third switching means associated with the first buffer capacitor for discharging the first buffer capacitor in a negative polarity to the load during the second polarity in the clock signals,
fourth switching means associated with the second buffer capacitor for discharging the second buffer capacitor in a negative voltage to the load during the first polarity in the clock signals, and
filter means associated with the first and second buffer capacitors and the third and forth switching means for becoming charged to the negative potential during the discharge of the first and second buffer capacitors and for being discharged in the negative potential to the load when the third and fourth switching means are not being discharged in the negative potential to the load.

14. In a combination as set forth in claim 13,
the third switching means and the fourth switching means being constructed to be operative simultaneously in preventing the discharge of the third and fourth switching means to the load during the time that the clock signals are changing between the first and second opposite polarities.

15. In a combination as set forth in claim 14,
means operatively coupled to the third switching means and the fourth switching means for regulating the discharge of the first buffer capacitor in the negative potential to the load during the second polarity in the clock signals and for regulating the discharge of the second buffer capacitor in the negative potential to the load during the first polarity in the clock signals.

16. In a combination as set forth in claim 14,
the regulating means including an operational amplifier and means for providing a control voltage from the operational amplifier in accordance with variations in the negative potential and means responsive to the variations in the control voltage for varying the discharge of the first buffer capacitor to the load during the second polarity in the clock signals and for varying the discharge of the second buffer capacitor to the load during the first polarity in the clock signals.

17. In combination for providing energy to a load,
means for providing an energizing potential,
means for providing a reference potential,
a pair of buffer capacitors,
a filter capacitor,
first switching means having conductive and non-conductive states,
second switching means having conductive and non-conductive states,
third switching means having conductive and non-conductive states,
fourth switching means having conductive and non-conductive states,
means for providing clock signals alternately having first and second opposite polarities
first circuit means including the first switching means, the first buffer capacitor, the energizing potential means and the reference potential means for charging the first buffer capacitor during the first polarity in the clock signals,
second circuit means including the second switching means, the second buffer capacitor, the energizing potential means and the reference potential means for charging the second buffer capacitor during the second polarity in the clock signals,
third circuit means including the third switching means, the first buffer capacitor and the reference potential means for discharging the first buffer capacitor in a negative potential to the load during the second polarity in the clock signals,
fourth circuit means including the fourth switching means, the second buffer capacitor and the reference potential means for discharging the second buffer capacitor in the negative potential to the load during the first polarity in the clock signals, and
filter means connected in the third circuit means and the fourth circuit means to become charged to the negative potential during the discharge of the first and second buffer capacitors and operative to discharg to the load during the time that the first and second buffer capacitors are not being discharged to the load.

18. In a combination as set forth in claim 17,
fifth switching means included in the third circuit means and the fourth circuit means for regulating the discharge of the first buffer capacitor in the negative potential to the load during the second polarity in the clock signals and for regulating the discharge of the second buffer capacitor in the negative potential to the load during the first polarity in the clock signals.

19. In a combination as set forth in claim 18,
means associated with the fifth switching means for varying the conductivity of the fifth switching means in accordance with variations in the magnitude of the negative potential.

20. In a combination as set forth in claim 19,
means including an operational amplifier for providing a control voltage variable in accordance with variations in the magnitude of the negative potential,
the fifth switching means being responsive to the control voltage to provide variations in its conductivity in accordance with the variations in the magnitude of the control voltage.

* * * * *